United States Patent
Veregin et al.

(10) Patent No.: US 11,628,494 B2
(45) Date of Patent: Apr. 18, 2023

(54) SURFACE ADDITIVE FOR THREE-DIMENSIONAL METAL PRINTING COMPOSITIONS

(71) Applicant: Xerox Corporation, Norwalk, CT (US)

(72) Inventors: Richard P. N. Veregin, Mississauga (CA); Karen A. Moffat, Brantford (CA)

(73) Assignee: Xerox Corporation, Norwalk, CT (US)

( * ) Notice: Subject to any disclaimer, the term of this patent is extended or adjusted under 35 U.S.C. 154(b) by 417 days.

(21) Appl. No.: 16/369,449

(22) Filed: Mar. 29, 2019

(65) Prior Publication Data

US 2020/0306830 A1 Oct. 1, 2020

(51) Int. Cl.
| | | |
|---|---|---|
| *B22F 1/102* | (2022.01) | |
| *B22F 1/065* | (2022.01) | |
| *B33Y 70/00* | (2020.01) | |
| *B22F 10/20* | (2021.01) | |
| *C08F 2/22* | (2006.01) | |
| *C08F 212/36* | (2006.01) | |
| *C08F 220/14* | (2006.01) | |

(52) U.S. Cl.
CPC .............. *B22F 1/102* (2022.01); *B22F 1/065* (2022.01); *B22F 10/20* (2021.01); *B22F 2301/205* (2013.01); *B22F 2301/35* (2013.01); *B22F 2304/10* (2013.01); *B22F 2998/00* (2013.01); *B33Y 70/00* (2014.12); *C08F 2/22* (2013.01); *C08F 212/36* (2013.01); *C08F 220/14* (2013.01)

(58) Field of Classification Search
None
See application file for complete search history.

(56) References Cited

U.S. PATENT DOCUMENTS

| | | |
|---|---|---|
| 3,590,000 A | 6/1971 | Palermiti et al. |
| 3,681,106 A | 8/1972 | Burns et al. |
| 3,847,604 A | 11/1974 | Hagenbach et al. |
| 4,298,672 A | 11/1981 | Lu |
| 4,338,390 A | 7/1982 | Lu |
| 4,533,614 A | 8/1985 | Fukumoto et al. |
| 4,845,006 A | 7/1989 | Matsubara et al. |
| 4,863,824 A | 9/1989 | Uchida et al. |
| 4,863,825 A | 9/1989 | Yoshimoto et al. |
| 4,917,983 A | 4/1990 | Uchida et al. |
| 4,931,370 A | 6/1990 | Amaya |
| 4,933,252 A | 6/1990 | Nishikawa et al. |
| 4,935,326 A | 6/1990 | Creatura et al. |
| 4,937,166 A | 6/1990 | Creatura et al. |
| 4,957,774 A | 9/1990 | Doi et al. |
| 4,973,539 A | 11/1990 | Sacripante et al. |
| 4,980,448 A | 12/1990 | Tajiri et al. |
| 4,981,939 A | 1/1991 | Matsumura et al. |
| 4,988,794 A | 1/1991 | Kubo et al. |
| 5,057,596 A | 10/1991 | Kubo et al. |
| 5,077,170 A | 12/1991 | Tsujihiro |
| 5,143,809 A | 9/1992 | Kaneko et al. |
| 5,227,460 A | 7/1993 | Mahabadi et al. |
| 5,236,629 A | 8/1993 | Mahabadi et al. |
| 5,290,654 A | 3/1994 | Sacripante et al. |
| 5,302,486 A | 4/1994 | Patel et al. |
| 5,330,874 A | 7/1994 | Mahabadi et al. |
| 5,376,494 A | 12/1994 | Mahabadi et al. |
| 5,480,756 A | 1/1996 | Mahabadi et al. |
| 5,500,324 A | 3/1996 | Mahabadi et al. |
| 5,601,960 A | 2/1997 | Mahabadi et al. |
| 5,629,121 A | 5/1997 | Nakayama |
| 5,650,484 A | 7/1997 | Hawkins et al. |
| 5,750,909 A | 5/1998 | Hawkins et al. |
| 6,063,827 A | 5/2000 | Sacripante et al. |
| 6,120,967 A | 9/2000 | Hopper et al. |
| 6,214,507 B1 | 4/2001 | Sokol et al. |
| 6,326,119 B1 | 12/2001 | Hollenbaugh, Jr. et al. |
| 6,358,657 B1 | 3/2002 | Silence et al. |
| 6,359,105 B1 | 3/2002 | Ianni et al. |
| 6,592,913 B2 | 7/2003 | Cook et al. |
| 6,593,053 B1 | 7/2003 | Chang et al. |
| 7,329,476 B2 | 2/2008 | Sacripante et al. |
| 8,663,886 B2 | 3/2014 | Vanbesien et al. |

(Continued)

FOREIGN PATENT DOCUMENTS

| | | |
|---|---|---|
| CA | 2717668 | 4/2011 |
| CA | 2891304 | 11/2015 |
| WO | WO/2015155542 | 10/2015 |

OTHER PUBLICATIONS

Richard P. N. Veregin, et al., U.S. Appl. No. 16/369,126, filed Mar. 29, 2019, "Toner Compositions and Processes Having Reduced or no Titania Surface Additives," not yet published.

(Continued)

*Primary Examiner* — Anthony J Zimmer
*Assistant Examiner* — Dean Mazzola
(74) *Attorney, Agent, or Firm* — Marylou J. Lavoie, Esq. LLC

(57) ABSTRACT

A composition including a three-dimensional metal printing powder; an organic polymeric additive on at least a portion of an external surface of the three-dimensional metal printing powder; and optionally, an inorganic additive on at least a portion of an external surface of the three-dimensional metal printing powder. A process for preparing a three-dimensional metal printing powder having an organic polymeric additive disposed thereon. A process for employing the three-dimensional metal printing powder including selective laser sintering.

20 Claims, No Drawings

(56) References Cited

U.S. PATENT DOCUMENTS

| | | | |
|---|---|---|---|
| 2006/0063085 A1 | 3/2006 | Lee et al. | |
| 2006/0216626 A1 | 9/2006 | Sacripante et al. | |
| 2006/0240259 A1* | 10/2006 | Toyoda | C09D 11/30 |
| | | | 106/499 |
| 2007/0202426 A1 | 8/2007 | Kikushima | |
| 2008/0107990 A1 | 5/2008 | Field et al. | |
| 2008/0236446 A1 | 10/2008 | Zhou et al. | |
| 2009/0047593 A1 | 2/2009 | Mizutani et al. | |
| 2012/0156605 A1* | 6/2012 | Vanbesien | G03G 9/09708 |
| | | | 430/108.2 |
| 2016/0177078 A1* | 6/2016 | Naito | C08L 67/02 |
| | | | 525/190 |
| 2016/0279703 A1* | 9/2016 | Clare | C23C 4/04 |
| 2017/0252974 A1* | 9/2017 | Ng | B22F 10/10 |
| 2017/0298194 A1 | 10/2017 | Farrugia et al. | |
| 2018/0022043 A1 | 1/2018 | Keoshkerian et al. | |
| 2019/0111479 A1* | 4/2019 | Kasperchik | B22F 1/0059 |
| 2020/0398338 A1* | 12/2020 | Kasperchik | B22F 1/0062 |
| 2020/0406351 A1* | 12/2020 | Kasperchik | B33Y 10/00 |

OTHER PUBLICATIONS

Richard P. N. Veregin, et al., U.S. Appl. No. 16/369,206, filed Mar. 29, 2019, "Cross-Linked Polymeric Latex Prepared With a Low Surface Tension Surfactant," not yet published.

Richard P. N. Veregin, et al., U.S. Appl. No. 16/369,013, filed Mar. 29, 2019, "Toner Compositions and Processes Including Polymeric Toner Additives," not yet published.

Richard P. N. Veregin, et al., U.S. Appl. No. 16/369,278, filed Mar. 29, 2019, "Surface Additive for Three-Dimensional Polymeric Printing Powders," not yet published.

Richard P. N. Veregin, et al., U.S. Appl. No. 16/369,359, filed Mar. 29, 2019, "Process for Preparing a Three-Dimensional Printing Composition," not yet published.

Richard P. N. Veregin, et al., U.S. Appl. No. 15/914,411, filed Mar. 7, 2018, "Toner Compositions and Surface Polymeric Additives," not yet published.

Shirin Alexander, et al., "Low-Surface Energy Surfactants With Branched Hydrocarbon Architectures," Langmuir, 2014, 30, 3413-3421.

Richard J. Farn, Editor, Chemistry and Technology of Surfactants, Blackwell Publishing, 2006.

Suzanna Lauren, "Surface and Interfacial Tension—What is it and How to Measure it?," White Paper, Biolin Scientific, Ver. 2017-06.

Extended European Search Report issued in European Application No. 20165337.5-1103, dated Aug. 21, 2020.

Blumel et al., "Increasing flowability and bulk density of PE-HD powders by a dry particle coating process and impact on LBM processes," Rapid Prototyping Journal, vol. 21, No. 6, 2015, 607-704.

Ralph L. Carr, Jr., Evaluating Flow Properties of Solids, Chem. Eng. 1965, 72, 163-168.

C. H. Ji et al., "Sintering Study of 316L stainless steel metal injection molding parts using Taguchi method: final destiny," Materials Science and Engineering, A311, 2001, 74-82.

Yan et al., "Influence of particle size on property of Ti—6Al—4V alloy prepared by high-velocity compaction," Transactions of Nonferrous Metals Society of China, 23, 2013, 361-365.

Dick Herzog et al. "Additive Manufacturing of Metals," Acta Materialia, 117, 2016, 371-392.

Canadian Office Action issued in Canadian Application No. 3,076,942, dated Apr. 21, 2021.

* cited by examiner

SURFACE ADDITIVE FOR THREE-DIMENSIONAL METAL PRINTING COMPOSITIONS

RELATED APPLICATIONS

Commonly assigned U.S. Publication No. 2020-0308328, entitled "Toner Compositions And Processes Including Polymer Toner Additives"), filed concurrently herewith, which is hereby incorporated by reference herein in its entirety, describes a polymeric composition including a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 60 percent by weight, based on the weight of the copolymer; and, optionally, a third monomer comprising an amine, wherein the third monomer, if present, is present in an amount of from about 0.5 percent by weight to about 5 percent by weight, based on the weight of the copolymer. A toner including the copolymer as a toner surface additive. An emulsion aggregation toner process including the copolymer as a toner surface additive.

Commonly assigned U.S. Publication No. 2020-0310268, entitled "Toner Compositions And Processes Having Reduced Or No Titania Surface Additives"), filed concurrently herewith, which is hereby incorporated by reference herein in its entirety, describes a toner including toner particles comprising at least one resin, in combination with an optional colorant, and an optional wax; and a copolymer toner additive on at least a portion of an external surface of the toner particles, the copolymer toner additive comprising a first monomer having a high carbon to oxygen ratio of from about 3 to about 8; and a second monomer comprising two or more vinyl groups, wherein the second monomer is present in the copolymer in an amount of from greater than about 8 percent by weight to about 60 percent by weight, based on the weight of the copolymer; wherein the copolymer toner additive has a volume average particle diameter of from about 20 nanometers to less than about 70 nanometers. An emulsion aggregation toner process including the copolymer as a toner surface additive.

Commonly assigned U.S. entitled "Cross-Linked Polymeric Latex Prepared With A Low Surface Tension Surfactant"), filed concurrently herewith, which is hereby incorporated by reference herein in its entirety, describes a polymeric composition including a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer is present in an amount of from about 0.1 percent by weight to about 1.5 percent by weight, based on the weight of the copolymer; and a surfactant, wherein the surfactant has a minimum surface tension at critical micelle concentration of less than about 30 mN/m. A toner including the copolymer as a toner surface additive. An emulsion aggregation toner process including the copolymer as a toner surface additive.

Commonly assigned U.S. No. 11,001,662, entitled "Surface Additive For Three-Dimensional Printing Polymeric Powders"), filed concurrently herewith, which is hereby incorporated by reference herein in its entirety, describes a composition including a three-dimensional polymeric printing powder; an organic polymeric additive on at least a portion of an external surface of the three-dimensional polymeric printing powder; and optionally, an inorganic additive on at least a portion of an external surface of the three-dimensional polymeric printing powder. A process for preparing a three-dimensional polymeric printing powder having an organic polymeric additive disposed thereon. A process for employing the three-dimensional polymeric printing powder including selective laser sintering.

Commonly assigned U.S. Publication No. 2020-0307027, entitled "Process For Preparing A Three-Dimensional Printing Composition"), filed concurrently herewith, which is hereby incorporated by reference herein in its entirety, describes a process including providing a three-dimensional printing powder dispersion comprising a three-dimensional printing powder, an optional dispersing agent, and water; providing an emulsion of an organic polymeric additive; combining the three-dimensional printing powder dispersion and the emulsion of organic polymeric additive to form a mixture comprising the three-dimensional printing powder dispersion and the emulsion of organic polymeric additive; and drying the mixture of the three-dimensional printing powder dispersion and the emulsion of organic polymeric additive.

BACKGROUND

Disclosed herein is a composition comprising a three-dimensional metal printing powder; an organic polymeric additive on at least a portion of an external surface of the three-dimensional metal printing powder; and optionally, an inorganic additive on at least a portion of an external surface of the three-dimensional metal printing powder.

Further disclosed is a process comprising providing a three-dimensional metal printing powder; providing an organic polymeric additive on at least a portion of an external surface of the three-dimensional metal printing powder; and optionally, further providing an inorganic additive on at least a portion of an external surface of the three-dimensional metal printing powder; wherein the organic polymeric additive is prepared by emulsion polymerization.

Further disclosed is a method comprising providing a three-dimensional metal printing powder having an organic polymeric additive on at least a portion of an external surface of the three-dimensional metal printing powder; and optionally, further having an inorganic additive on at least a portion of an external surface of the three-dimensional metal printing powder; and exposing the three-dimensional metal printing powder having the organic polymeric additive and optional inorganic additive to a laser to fuse the three-dimensional metal printing powder.

Additive Manufacturing involves a layer by layer shaping process that consolidates a powder feedstock into a physical object or part using a computer controlled laser which is programmed by the computer aided drawing (CAD) geometry file of the part. The computer controlled laser is used to melt the building layers together to create the three-dimensional (3D) object. There are a number of different additive manufacturing technologies that use powders as the building feedstock. The powder materials can be thermoplastic polymers such as polyamide, polylactic acid, polyether ether ketone (PEEK), or the powders can be metal powders. Technologies such as Selective Laser Sintering (SLS), Selective Laser Melting (SLM), Direct Metal Laser Sintering (DMLS) or Electron Beam Melting (EBM), to name a few, use powder feedstocks as the building material. These fabrication methods involve powders as a bed of particles or deliver the powder through a nozzle.

Metal powders are used to construct very unique and complicated parts for a variety of industries such as automotive, airplanes or aerospace. Metal powders are also used to build porous parts for use in different biomedical applications such as for orthopaedic bone scaffolding. Examples of metal powders include cobalt, copper, iron, nickel, titanium, 316L stainless steel, as well as alloys, including titanium alloys such as Ti6A14V, TiAl, aluminum alloys, cobalt-chromium alloys, nickel-based superalloys and others.

In applications that use metal powders, the metal powder desirably has characteristics which result in the formation of a smooth surfaced object. In addition to particle chemistry, particle size, particle size distribution, and packing density, a good flowing metal powder is required since this influences the surface roughness of the finished object.

The metal powders can be produced by water or gas or plasma atomization. Depending on the environment and technique used to produce the metal powders, the particle shape; spherical or irregular, and surface chemistry, hydroscopic or hydrophobic, will vary. Regardless of how the metal powders are formed, to meet additive manufacturing process requirements, good flow properties are needed to achieve homogeneous spreading of the powder and good packing characteristics.

In 3D applications using particulate powders, such as metal powders, there are a number of serious problems that can occur due to inter-particle interactions within the powder. These include particulate flow, which enables the powder to flow within the 3D printer and in the powder bed, as well as how tightly the powders pack together for the sintering step. High inter-particle forces lead to poor flow, which can limit the speed at which powder is supplied, or can cause the particles to clog up the delivery system. Also high inter-particle forces mean particles do not pack well, which can lead to large pores and poor sintering, leaving a weak, irregularly shaped, rough surfaced and porous final part. Finally, the powder from a bed can be reused. For metal powders the recycling can result in the particles sticking together due to proximate heating as the part is formed. After one or more recycling steps, the particle flow can be degraded, and particles may also start to stick together in clumps, leading to even more tendency to slow or clog the delivery system, or to form non-uniform, porous and weak parts.

It is known in the art for 3D applications, that nanoparticulate silica powders can be used as additives for improving flow (see, for example, "Increasing flowability and bulk density of PE-HD powders by a dry particle coating process and impact on LBM processes" C. Blümel et. al. Rapid Proto J 21 (2015) 697-704) of the powder, and thus the quality of the final part, in particular improving the porosity and density of the part, and thus the part's overall strength. However, silica chemistry is not necessarily a good match with the chemistry of the 3D powder, and thus is not necessarily effective. Further silica is refractory, so it melts at a very high temperature and will become part of the composition of the part as a contaminant.

While currently available 3D printing materials are suitable for their intended purposes, there remains a need for new additives to improve the flow and blocking of 3D metal powders, to enable recycling of the 3D powder, and to provide high density and strong parts with minimum metal contamination.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a composition comprising a three-dimensional metal printing powder; an organic polymeric additive on at least a portion of an external surface of the three-dimensional metal printing powder; and optionally, an inorganic additive on at least a portion of an external surface of the three-dimensional metal printing powder.

Also described is a process comprising providing a three-dimensional metal printing powder; providing an organic polymeric additive on at least a portion of an external surface of the three-dimensional metal printing powder; and optionally, further providing an inorganic additive on at least a portion of an external surface of the three-dimensional metal printing powder; wherein the organic polymeric additive is prepared by emulsion polymerization.

Also described is a method comprising providing a three-dimensional metal printing powder having an organic polymeric additive on at least a portion of an external surface of the three-dimensional metal printing powder; and optionally, further having an inorganic additive on at least a portion of an external surface of the three-dimensional metal printing powder; and exposing the three-dimensional metal printing powder having the organic polymeric additive and optional inorganic additive to a laser to fuse the three-dimensional metal printing powder.

DETAILED DESCRIPTION

A polymeric surface additive prepared by emulsion polymerization to be used with, or instead of a silica or other inorganic additive, on the surface of a three-dimensional (3D) metal printing powder, is provided. The polymeric surface additive improves the flow or blocking performance of the 3D metal powder, and thus improves the density and strength of the produced parts. There are a number of potential advantages for an organic additive compared to an inorganic additive such as silica. First, the organic chemistry of the monomers can be selected to be compatible with that of the 3D powder for effective blending. This can be done by changing the matrix polymer of the polymeric latex or by changing the amount of a co-monomer that has either acid or basic functionality. Thus, the hydrophobicity and the acid-base chemistry can be tuned as required. The organic latex additive can be crosslinked or non-crosslinked. The crosslinked additive is more robust to aggressive handling, as, to be effective, the additive must stay as a spherical particle on the 3D particle surface. If the particle flattens, then it will no longer be functional as a surface additive. However, under most conditions in 3D printing, such robustness may not be required, in which case a non-crosslinked organic polymeric latex as described herein is selected as the surface additive. The advantage of the non-crosslinked organic polymeric latex is that it can be formulated to melt in the sintering process, and thus be less likely to interfere with the proper sintering of parts.

The use of the present crosslinked or uncrosslinked polymeric latex additive enables excellent powder flow as the part is being constructed, but during the high temperature sintering process the polymeric latex additive will burn off and will not be left behind as a contaminate of the part.

In embodiments, the organic polymeric additives herein comprise a monomer selected from the group consisting of an acrylate monomer, a methacrylate monomer, and combinations thereof. The organic polymeric surface additives herein can have as the matrix monomer of the polymeric composition cyclohexyl methacrylate (CHMA), which is a hydrophobic monomer which can mimic the hydrophobicity of silane treated silica. To this can be added a monomer composition of divinyl benzene (DVB), which creates a highly cross-linked structure, to create a hard particle that will remain as a spherical particle with aggressive handling. The cross-linker can be left out of the formulation if cross-linking is not required or desired. An optional third monomer of the polymeric additive composition can be dimethylaminoethyl methacrylate (DMAEMA). The DMAEMA is optional for applications directed to 3D particles, but potentially would be a good match to a metal particle, for example, due to the nitrogen group, which would interact strongly with the surface metal atoms. Alternately, CHMA organic additive latex can be prepared with acid functionality, using β-CEA or acrylic acid. The acid group would interact strongly with the surface metal atoms. Alternately, if it is desired to reduce the strength of the interaction of the metal powder surface with the polymeric additive, it would be desirable not to have a functional group, and have just the hydrophobic CHMA monomer, which would be less strongly attached to the surface. Compared to a comparable size silica, an organic additive requires less additive to effectively cover the surface compared to a silica, as the organic polymer latex density is typically less than 1.4 g/cm$^3$, while silica is 2.2 g/cm$^3$, and other inorganic additives are even higher, and so require proportionally higher loading.

As used herein, a polymer or co-polymer is defined by the monomer(s) from which a polymer is made. Thus, for example, while in a polymer made using an acrylate monomer as a monomer reagent, an acrylate moiety per se no longer exists because of the polymerization reaction, as used herein, that polymer is said to comprise the acrylate monomer. Thus, an organic polymeric additive made by a process disclosed herein can be prepared, for example, by the polymerization of monomers including cyclohexyl methacrylate, divinyl benzene, and dimethylaminoethyl methacrylate. The resulting organic polymeric additive can be said to comprise cyclohexyl methacrylate as that monomer was used to make the organic polymeric additive; can be said to be composed of or as comprising divinyl benzene as divinyl benzene is a monomer reagent of that polymer; and so on. Hence, a polymer is defined herein based on one or more of the component monomer reagents, which provides a means to name the organic polymeric additives herein.

For blocking performance, it is also desirable to recycle the 3D powder. Powder that has been in close proximity to the heating source in the sintering process may clump together due to some melting. On recycling, these clumps may not readily break up, such that they are sufficiently blocked that they are effectively stuck together. When this material is recycled, this can lead to poor 3D powder flow. In embodiments herein, the organic polymeric latex additive is used as a surface additive to improve blocking.

In embodiments, an organic polymeric additive is provided comprising a polymer or copolymer comprising a first monomer having a high carbon to oxygen ratio of from about 3 to about 8; an optional second monomer comprising two or more vinyl groups, wherein the second monomer, if present, can be present in the copolymer in an amount of from greater than about 8 percent by weight to about 40 percent by weight, based on the weight of the copolymer; and optionally, a third monomer comprising an amine, wherein the third monomer, if present, is present in an amount of from about 0.5 percent by weight to about 1.5 percent by weight, based on the weight of the copolymer. In embodiments, the organic polymer additive further comprises a surfactant. In certain embodiments, the surfactant has a minimum surface tension of less than about 45 mN/m.

The organic polymeric surface additive, also termed herein an organic polymeric additive or a polymer or copolymer organic additive, in embodiments, is a latex formed using emulsion polymerization. The latex includes at least one monomer with a high carbon to oxygen (C/O) ratio optionally combined with a monomer possessing two or more vinyl groups, optionally combined with a monomer containing an amine functionality. The aqueous latex is then dried and can be used in place of, or in conjunction with, other additives. The use of a high C/O ratio monomer provides good relative humidity (RH) stability, and the use of the amine functional monomer may provide desirable adhesion of the organic polymer additive to the surface of the 3D particles. The DMAEMA is optional for applications directed to 3D particles, but potentially would be a good match to a 3D metal powder, which would interact strongly with the surface metal atoms on the 3D metal powder, resulting in good attachment of the polymeric additive to the metal particle surface. Alternately, CHMA organic additive latex can be prepared with acid functionality, using β-CEA or acrylic acid. The acid group would interact strongly with the surface metal atoms of the 3D powder, again effectively attaching the polymer additive to the metal particle surface. Alternately, it could be desirable not to have a functional group, and have just the hydrophobic CHMA monomer, which would reduce the interaction of the polymeric additive with the surface of the metal powder, if this was desired. The use of a monomer possessing two or more vinyl groups, sometimes referred to herein, in embodiments, as a cross-linking monomer or a crosslinking vinyl monomer, provides a crosslinked property to the polymer additive, thereby providing mechanical robustness.

In embodiments, the organic additive comprises at least one non-cross-linkable polymerizable monomer; or the organic additive comprises at least one cross-linkable polymerizable monomer; or the organic additive comprises a combination of at least one non-cross-linkable polymerizable monomer and at least one cross-linkable polymerizable monomer.

In certain embodiments, the organic polymeric additive is free of cross-linkable polymerizable monomers.

The resulting organic polymer or copolymer additive may be used as an additive with three-dimensional printing compositions, providing the resulting three-dimensional printing compositions with desired characteristics including improved flow and blocking as well as the ability to prepare high density and strong parts. The polymeric additives herein may be used at a lower density compared with other additives, so that much less material by weight is required for equivalent surface area coverage, compared to inorganic additives, including oxides such as titania and silica. The polymeric additives of the present disclosure may also provide the three-dimensional printing powders with a wide range of properties including robustness, desired melting properties, among other properties, depending on the monomers used in the formation of the organic polymers or copolymers.

As noted above, the organic polymeric or copolymeric additive may be in a latex. In embodiments, a latex polymer or copolymer utilized as the organic polymeric surface additive may include a first monomer having a high C/O ratio, such as an acrylate or a methacrylate. The C/O ratio of such a monomer may be from about 3 to about 8, in embodiments, from about 4 to about 7, or from about 5 to about 6. In embodiments, the monomer having a high C/O ratio may be an aliphatic cycloacrylate. Suitable aliphatic cycloacrylates which may be utilized in forming the polymer additive include, for example, cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, benzyl methacrylate, phenyl methacrylate, combinations thereof, and the like.

The first monomer having a high carbon to oxygen ratio, in embodiments, a cycloacrylate, may be present in the polymer or copolymer utilized as an organic polymeric additive in any suitable or desired amount. In embodiments, the cycloacrylate may be present in the polymer or copolymer in an amount of from about 40 percent by weight of the copolymer to about 99.4 percent by weight of the copolymer, or from about 50 percent by weight of the copolymer to about 95 percent by weight of the copolymer, or from about 60 percent by weight of the copolymer to about 95 percent by weight of the copolymer. In embodiments, the first monomer is present in the copolymer in an amount of from about 40 percent by weight to about 90 percent by weight, based on the weight of the copolymer, or from about 45 percent by weight to about 90 percent by weight, based on the weight of the copolymer.

The organic polymer or copolymer additive optionally includes a second monomer, wherein the second monomer comprises a crosslinking monomer. In embodiments, the second monomer comprises a crosslinking monomer possessing vinyl groups, in certain embodiments, two or more vinyl groups.

Suitable monomers having vinyl groups for use as the crosslinking vinyl containing monomer include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2',-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, divinyl ether, combinations thereof, and the like. In a specific embodiment, the cross-linking monomer is divinyl benzene.

The organic polymer or copolymer additive herein optionally comprises a second monomer which results in the organic additive being a highly crosslinked copolymer. In embodiments, the second monomer comprising two or more vinyl groups is present in the copolymer in an amount of greater than about 8 percent by weight to about 60 percent by weight, based upon the weight of the copolymer, or greater than about 10 percent by weight to about 60 percent by weight, based upon the weight of the copolymer, or greater than about 20 percent by weight to about 60 percent by weight, based upon the weight of the copolymer, or greater than about 30 percent by weight to about 60 percent by weight, based upon the weight of the copolymer. In certain embodiments, the second monomer is present in the copolymer in an amount of greater than about 40 percent by weight to about 60 percent by weight, or greater than about 45 percent by weight to about 60 percent by weight, based on the weight of the copolymer.

In embodiments, the organic polymeric additive comprises a cross-linkable monomer containing 2 or more vinyl groups; and the cross-linkable monomer containing 2 or more vinyl groups is present in the organic polymeric additive in an amount of greater than zero up to about 40 percent, by weight, based on the total weight of the organic polymeric additive.

In an alternate embodiment, as mentioned above, the organic polymer or copolymer additive does not contain a crosslinking monomer.

The organic polymer or copolymer additive herein optionally further comprises a third monomer comprising an amine functionality. Monomers possessing an amine functionality may be derived from acrylates, methacrylates, combinations thereof, and the like. In embodiments, suitable amine-functional monomers include dimethylaminoethyl methacrylate (DMAEMA), diethylaminoethyl methacrylate, dipropylaminoethyl methacrylate, diisopropylaminoethyl methacrylate, dibutylaminoethyl methacrylate, combinations thereof, and the like.

In embodiments, the organic copolymer additive herein does not contain the third monomer. In other embodiments, the organic copolymer additive herein contains the third monomer comprising an amine-functional monomer. The amine-functional monomer, if present, may be present in the organic copolymer in an amount of from about 0.1 percent by weight of the copolymer to about 40 percent by weight of the copolymer, or from about 0.5 percent by weight of the copolymer to about 5 percent by weight of the copolymer, or from about 0.5 percent by weight of the copolymer to about 1.5 percent by weight of the copolymer.

In embodiments, the organic copolymer additive comprises an acidic monomer, a basic monomer, or a combination thereof. In certain embodiments, the organic polymeric additive comprises a basic monomer having a nitrogen-containing group; and the basic monomer having a nitrogen-containing group is present in the organic polymeric additive in an amount of less than about 1.5 percent, by weight, based on the total weight of the organic polymeric additive. In other embodiments, the organic polymeric additive comprises an acidic monomer having an acidic group selected from the group consisting of acrylic acid, beta-carboxyethyl acrylate, and combinations thereof; and the acidic monomer is present in the organic polymeric additive in an amount of less than about 4 percent, by weight, based on the total weight of the organic polymeric additive.

In embodiments, the organic copolymer additive comprises cyclohexyl methacrylate as a hydrophobic monomer and divinyl benzene as a cross-linkable monomer. In certain embodiments, the copolymer additive comprises cyclohexyl methacrylate as a hydrophobic monomer, divinyl benzene as a cross-linkable monomer, and dimethylaminoethyl methacrylate as a nitrogen-containing monomer. In other embodiments, the copolymer additive is free of the cross-linkable monomer.

Methods for forming the organic polymer or copolymer surface additive are within the purview of those skilled in the art and include, in embodiments, emulsion polymerization of the monomers utilized to form the polymeric additive.

In the polymerization process, the reactants may be added to a suitable reactor, such as a mixing vessel. The appropriate amount of starting materials may be optionally dissolved in a solvent, an optional initiator may be added to the solution, and contacted with at least one surfactant to form an emulsion. A copolymer may be formed in the emulsion (latex), which may then be recovered and used as the polymeric additive for a three-dimensional printing composition.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, the latex for forming the organic polymeric additive may be prepared in an aqueous phase containing a surfactant or co-surfactant, optionally under an inert gas such as nitrogen. Thus, in embodiments, the organic polymeric additive comprises latex particles produced by emulsion polymerization of at least one monomer and a surfactant.

The surfactant selected for the organic polymer or copolymer may be any suitable or desired surfactant. The surfactant can be a member of the group consisting of an anionic surfactant, a cationic surfactant, a non-ionic surfactant, and combinations thereof.

In embodiments, the surfactant comprises a member of the group consisting of sodium dodecylbenzene sulfonate, sodium dodecyl sulphate, and combinations thereof.

In certain embodiments, the surfactant selected for the present polymer or co-polymer surface additive is a surfactant having a selected surface tension which enables preparation of a smaller sized particle, in embodiments, wherein the polymeric composition comprises latex particles of the copolymer and the surfactant wherein the latex particles having a volume average particle diameter of less than 70 nanometers.

The organic polymeric additive can comprise latex particles having a volume average particle diameter of from about 30 nanometers to about 140 nanometers. In embodiments, the organic polymer or copolymer additive herein has a particle size of less than 70 nanometers, or less than 50 nanometers, or from about 20 to less than 70 nanometers, or from about 20 to about 50 nanometers, or from about 20 to less than 50 nanometers D50 by volume measured using a Nanotrac NPA252 from Microtrac, Inc.

In embodiments, an organic polymeric composition herein comprises latex particles of the copolymer and the surfactant, wherein the latex particles have a volume average particle diameter of from about 20 nanometers to less than 70 nanometers, or from about 20 nanometers to about 50 nanometers, or from about 20 nanometers to less than 50 nanometers.

In embodiments, a surfactant is selected having a minimum surface tension at critical micelle concentration of less than about 30 millinewtons per meter (mN/m). In embodiments, the surfactant selected has a minimum surface tension of from about 10 to less than 30 mN/m, or from about 15 to less than 30 mN/m, or from about 15 to about 25 mN/m, or from about 15 to about 21 mN/m. In embodiments, the surfactant has a minimum surface tension at critical micelle concentration of less than 30 mN/m, or about 20 to about 25 mN/m. In embodiments, the surfactant selected has a minimum surface tension of less than about 45 mN/m.

In embodiments, the organic polymeric additive herein comprises latex particles produced by emulsion polymerization of at least one monomer and a surfactant; wherein the surfactant comprises a member of the group consisting of an anionic surfactant, a cationic surfactant, a non-ionic surfactant, and combinations thereof; and wherein the surfactant has a minimum surface tension of less than about 45 mN/m.

In embodiments, the organic polymeric additive comprises latex particles produced by emulsion polymerization of at least one monomer and a surfactant; wherein the surfactant comprises a member of the group consisting of sodium dodecylbenzene sulfonate, sodium dodecyl sulphate, and combinations thereof.

Surface tension of the surfactant can be measured by any suitable or desired method as known in the art. For example, surfactant surface tension can be measured by force tensiometry based on measuring the forces exerted on a probe that is positioned at the liquid-gas interface, as discussed in more detail in the Attension® White Paper and references included therein, entitled "Surface and interfacial tension, —what is it and how to measure it," by Susanna Lauren, Biolin Scientific. Two probe configurations are commonly used, the du Noüy ring and the Wilhelmy plate. A metal (such as platinum) rod can also be used instead of a Wilhelmy plate when sample volume is limited. Surface tension can also be measured optically, this is called optical tensiometry and is based on the analysis of a pendant drop shape.

As known in the art, critical micelle concentration (CMC) is defined as the concentration of surfactants above which micelles form and all additional surfactants added to the system go to micelles.

As known in the art, a micelle is an aggregate (or supramolecular assembly) of surfactant molecules dispersed in a liquid colloid. A typical micelle in aqueous solution forms an aggregate with the hydrophilic "head" regions in contact with surrounding solvent, sequestering the hydrophobic single-tail regions in the micelle center.

As discussed above, the surfactant selected can be any suitable or desired surfactant. In embodiments, the surfactant is selected to achieve a desired characteristic of smaller sized co-polymer surface additive. In embodiments, the surfactant is selected from the group consisting of dodecylbenzene sulfonate, trisiloxanes such as $((CH_3)_3SiO_2)_2Si-(CH_3)(CH_2)_3(OCH_2CH_2)nOH$ with n=4-12, that have a surface tension at the critical micelle concentration of 20-21 mN/m, oxyethylated alcohols, $C_{14}EO_8$, $C_{12}EO_5$ and $C_{10}EO_4$, dimethyldidodecyl-ammonium bromide (DDAB); perfluorocarboxylic acids and salts thereof, $C_6F_{13}COOLi$, $C_7F_{15}COOH$, $C_7F_{15}COONa$, $C_8F_{17}COOH$, $C_8F_{17}COOLi$, $C_8F_{17}COONa$, $C_8F_{17}COONH_4$, $C_8F_{17}COONH_3C_2H_4OH$, $C_{10}F_{21}COOLi$, $C_{10}F_{21}COONH_4$, $C_{10}F_{21}COONH_3C_2H_4OH$, $C_{12}F_{25}COOLi$, salts of perfluoroalkanesulfonic acid, $C_8F_{17}SO_3Li$, $C_8F_{17}SO_3Na$, $C_8F_{17}SO_3NH_4$, $C_8F_{17}SO_3NH_3C_2H_4OH$, other specific fluorosurfactants include Novec™ FC-4430, FC-4432, FC-4434 non-ionic, polymeric surfactants from 3M™, FC-5120 anionic ammonium fluoroalkylsulfonate, specifically nonafluorobutyl [sulfonyl]amino-2-hydroxy-1-propanesulfonic acid, ammonia salt, from 3M™, Zonyl® FSN-100, Zonyl® FS-300, non-ionic ethoxylates from DuPont™, Zonyl® FS-500 an amphoteric betaine from DuPont™, Capstone™ FS-10 perfluoroalkylsulfonic acid from DuPont™, Capstone™ FS-30 non-ionic ethoxylate from DuPont™, Capstone™ FS-60 anionic blend from DuPont™, Capstone™ FS-61 anionic phosphate from DuPont™, Capstone™ FS-63 anionic phosphate from DuPont™, Capstone™ FS-64 anionic phosphate DuPont™, Capstone® FS-65 non-ionic from DuPont™. Highly branched hydrocarbon surfactants, including isostearyl sulphate Na salt, isostearyl sulphate tetrapropylammonium salt, and $(CH_3)_3CCH_2CH(CH_3)CH_2PO_4Na$ may also be selected. In embodiments, with an appropriate choice of counterion, the surface tension can be reduced to less than 30 mN/m at the critical micelle concentration, such as for dioctyl ammonium sulfosuccinate, dioctyl triethylamine sulfosuccinate, dioctyl trimethylamine sulfosuccinate, and dioctyl tetrapropylammonium sulfosuccinate. See, S. Alexander et. al, Langmuir 2014, 30:3413-3421. To address environmental concerns of fluorosurfactants regarding potential issues around bioaccumulation and environmental impact, 3M has created a nonafluorobutanesulphonyl fluoride intermediate that is converted into fluorosurfactants through a sulphonamide process. These new materials have a perfluoroalkyl group with n<4 and are not of as much concern from a regulatory perspective as are fluorochemicals with n>4. Previously commercialized under the Fluorad™ trademark, they are now replaced by Novec™, with surface tensions of 15-21 mN/m at concentration of 10-5 to 10-3 mol/L in pH 8 buffered aqueous solutions. See, Farn, R. J. (Ed.), (2006), Chemistry and Technology of Surfactants, Blackwell Publishing Ltd. In embodiments, the surfactant is a dodecylbenzene sulfonate. In other embodiments, the surfactant is sodium dodecylbenzene sulfonate.

In embodiments, the surfactants which may be utilized to form the latex dispersion can be used in an amount of from about 0.1 to about 15 weight percent of all of the ingredients of the latex, the monomers, water, initiator and surfactant, and in embodiments of from about 0.2 to about 5 weight percent of the all of the ingredients of the latex, the monomers, water, initiator and surfactant, and in embodiments from about 0.3 to about 2 weight percent of all of the ingredients of the latex, the monomers, water, initiator and surfactant.

In certain embodiments, a polymeric composition herein comprises a latex including latex particles of the copolymer and the surfactant and water, wherein the surfactant is present in an amount of from about 0.1 to about 15, or from about 0.2 to about 5, or from about 0.3- to about 2 percent by weight, based upon the weight of all the latex ingredients, including the resin, the water, the surfactant, and the initiator. In embodiments, the surfactant is present in an amount of from about 0.3 to about 2 percent by weight, based upon the weight of all the ingredients in the latex, including the monomers, the water, the initiator and the surfactant.

In embodiments initiators may be added for formation of the latex utilized in formation of the organic polymeric additive. Examples of suitable initiators include water soluble initiators, such as ammonium persulfate, sodium persulfate and potassium persulfate, and organic soluble initiators including organic peroxides and azo compounds including Vazo™ peroxides, such as VAZO 64™, 2-methyl 2-2,-azobis propanenitrile, VAZO88™, 2-2'-azobis isobutyramide dehydrate, and combinations thereof. Other water-soluble initiators which may be utilized include azoamidine compounds, for example 2,2',-azobis(2-methyl-N-phenyl-propionamidine) dihydrochloride, 2,2'-azobis[N-(4-chloro-phenyl)-2-methylpropionamidine]di-hydrochloride, 2,2',-azobis[N-(4-hydroxyphenyl)-2-methyl-propionamidine] dihydrochloride, 2,2',-azobis[N-(4-amino-phenyl)-2-methylpropionamidine]tetrahydrochloride, 2,2',-azobis[2-methyl-N(phenylmethyl)propionamidine]dihydrochloride, 2,2',-azobis[2-methyl-N-2-propenylpropionamidinedihydrochloride, 2,2',-azobis[N-(2-hydroxy-ethyl)2-methylpropionamidine]dihydrochloride, 2,2'-azobis[2(5-methyl-2-imidazolin-2-yepropane]dihydrochloride, 2,2',-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2,-azobis[2-(3,4,5,6-tetrahydropyrimidin-2-yl)propane]dihydrochloride, 2,2',-azobis[2-(5-hydroxy-3,4,5,6-tetrahydropyrimidin-2-yl) propane]dihydrochloride, 2,2',-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent, or from about 0.2 to about 5 weight percent, of the monomers.

In forming the emulsions, the starting materials, surfactant, optional solvent, and optional initiator may be combined utilizing any means within the purview of those skilled in the art. In embodiments, the reaction mixture may be mixed for from about 1 minute to about 72 hours, in embodiments from about 4 hours to about 24 hours, while keeping the temperature at from about 10° C. to about 100° C., or from about 20° C. to about 90° C., or from about 45° C. to about 75° C.

Those skilled in the art will recognize that optimization of reaction conditions, temperature, and initiator loading can be varied to generate polymers of various molecular weights, and that structurally related starting materials may be polymerized using comparable techniques.

The resulting latex, possessing the polymeric additive of the present disclosure, may have a C/O ratio of from about 3 to about 8, in embodiments from about 4 to about 7.

The resulting latex, possessing the polymeric additive of the present disclosure, may be applied to three-dimensional metal printing powder utilizing any means within the purview of one skilled in the art. In embodiments, the three-dimensional metal printing powder may be dipped in or sprayed with the latex including the polymeric additive, thus becoming coated therewith, and the coated particles may then be dried to leave the polymeric coating thereon. In embodiments, the organic polymeric additive may be blended with the desired three-dimensional metal printing powder in any suitable or desired fashion such as mixing or blending in a mill.

In other embodiments, once the polymer or copolymer utilized as the additive for the 3D metal powder has been formed, it may be recovered from the latex by any technique within the purview of those skilled in the art, including filtration, drying, centrifugation, spray draying, combinations thereof, and the like.

In embodiments, once obtained, the copolymer utilized as the additive for a 3D metal powder may be dried to powder form by any method within the purview of those skilled in the art, including, for example, freeze drying, optionally in a vacuum, spray drying, combinations thereof, and the like. The dried polymeric additive of the present disclosure may then be applied to 3D metal powder utilizing any means within the purview of those skilled in the art including, but not limited to, mechanical impaction and/or electrostatic attraction.

The organic polymer or copolymer additive herein is a smaller size than previous organic toner additives. In embodiments, the organic polymer or copolymer additive has an average or median volume average particle size (d50) of less than 70 nanometers. In embodiments, the organic polymer or copolymer additive has an average or median particle size (d50) of from about 20 nanometers to less than 70 nanometers, or from about 20 nanometers to about 65 nanometers, or from about 20 to about 60 nanometers, or from about 20 to about 50 nanometers. In specific embodiments, the copolymer additive herein has an average or median particle size (d50) of less than 50 nanometers, such as from about 20 to less than 50 nanometers.

In embodiments, the composition may further include a second larger organic polymer or copolymer additive comprising an organic cross-linked surface additive having a particle size of from about 70 nanometers to about 250 nanometers in diameter. These larger particles of copolymer surface additive may have an average or median particle size (d50) of from about 70 nanometers to about 250 nanometers in diameter, or from about 80 nanometers to about 200 nanometers in diameter, or from about 80 to about 115 nanometers. Advantageously, the teachings of the present disclosure render it easier to arrive at the desired particle size, in embodiments, a copolymer size as described herein.

If the second, larger size copolymer organic additive comprising an organic cross-linked surface additive is present, it can be present in an amount of from about 0.05 parts per hundred by weight to about 5 parts per hundred by weight, or from about 0.2 parts per hundred by weight to about 0.4 parts per hundred by weight, or 0.3 parts per hundred by weight to about 1.5 parts per hundred by weight, based on 100 parts by weight of the 3D printing powder The three-dimensional printing powder composition may include two or more emulsion polymerized latex organic polymer or copolymer additives where the average D50 particle size of the organic polymer or copolymer additive differs by at least 10 nanometers. In embodiments, the three-dimensional printing composition comprises two or more organic polymeric additives; wherein a first organic polymeric additive has a first average D50 particle size; wherein a second organic polymeric additive has a second average D50 particle size; and wherein the first and second average D50 particle size differ by at least about 10 nanometers.

The copolymers utilized as the organic polymeric additive, in embodiments, are not soluble in solvents such as tetrahydrofuran (THF) due to their highly cross-linked nature. Thus, it is not possible to measure a number average molecular weight (Mn) or a weight average molecular weight (Mw), as measured by gel permeation chromatography (GPC).

The polymer or copolymers utilized as the organic polymeric additive may have a glass transition temperature (Tg) of from about 45° C. to about 200° C. In embodiments, the organic polymeric additive has a glass transition temperature of from about 85° C. to about 140° C., in embodiments from about 100° C. to about 130° C.

In embodiments, a process herein comprises providing a three-dimensional metal printing powder; providing an organic polymeric additive on at least a portion of an external surface of the three-dimensional metal printing powder; and optionally, further providing an inorganic additive on at least a portion of an external surface of the three-dimensional metal printing powder; wherein the organic polymeric additive is prepared by emulsion polymerization.

Metal Particles.

In embodiments, the 3D powder herein comprises a metal or a metal-containing powder. Metals powders for additive manufacturing are produced by water, gas or plasma atomization. See, for example, "Additive Manufacturing of Metals," D. Herzog et al, Acta. Materialia, 117 (2106) 371-392). Different processes to produce the metal powders result in different powder characteristics such as particle morphology, particle size and chemical composition. Water atomization is typically used for steel, but it is not suitable for reactive materials such as titanium. Water atomization is low cost, but particles will vary in size from a few microns up to about 500 microns and they adopt an irregular shape. The irregular shape reduces packing density. Water atomized metal particles contain higher oxygen content and formation of an oxide layer on the particle surface reduces the flow of the powder and changes the bulk composition and mechanical properties. To overcome the disadvantage of water atomization, gas atomization is used to produce metal powders for additive manufacturing. The risk of oxidation is reduced by implementing an inert atmosphere such as argon or nitrogen. Gas atomization is used for reactive metals such as titanium. Due to cooling in an inert atmosphere heat conduction between metal and surrounding gas allows formation of spherical powder particles.

Any suitable or desired three-dimensional metal printing powder can be selected. In embodiments, the three-dimensional metal printing powder can be a metal, a metal alloy, or a combination thereof. In embodiments, the three-dimensional metal printing powder comprises a metal selected from the group consisting of titanium, aluminum, silver, cobalt, chromium, copper, iron, nickel, gold, palladium, stainless steel, alloys thereof, and combinations thereof. Exemplary alloys include titanium alloys such as Ti6A14V, TiAl, aluminum alloys, cobalt-chromium alloys, nickel-based superalloys, and others.

In further embodiments, the three-dimensional metal printing powder comprises a metal selected from the group consisting of aluminum and aluminum alloys, stainless steel, tool steel, titanium and titanium alloys, copper and copper alloys, brass, cobalt chrome (also known as cobalt chromium) alloys, nickel iron alloys, nickel chromium superalloys, precious metals, such as gold, platinum, palladium, and silver, which can also be used for applications such as jewelry making, exotic metal powders, including palladium, tantalum and, rhenium and niobium. In embodiments, specific metals powders that can be utilized for 3D printing powders include stainless steel metal powders, including 316L (low-carbon), 17-4PH, hot-work and maraging steel; low-density aluminum alloys like $AlSi_{10}Mg$ and AlSi12; $AlSi_7Mg_{0.6}$, 6061 and 7075-series aluminum alloys; cobalt chrome alloys including ASTM F75 CoCr; titanium alloys including Ti6A14V and Ti6A14V (ELI), where Ti6A14V is a titanium alloy that is 6 percent aluminum and 4 percent vanadium; unalloyed, commercially pure titanium which is available in grades one through four; nickel chromium super-alloys like Inconel® 718 and Inconel® 625; nickel iron alloys such as FeNi36 or 64FeNi in the US, and also known as Invar®; nickel iron cobalt alloys such as Kovar® a nickel-cobalt ferrous iron alloy compositionally identical to Fernico 1.

Metal powders for additive manufacturing can be purchased from a variety of sources. Additive manufacturing powders sold under the name TruForm™ are available from Praxair, Inc. See, for example, the worldwide web at http://www.praxairsurfacetechnologies.com/en/components-materials-and-equipment/materials/additive-manufacturing-powders. Metal alloys and powders sold under the name Osprey™ are available from Sandvik AB. See, for example, the worldwide web at haps://www.materials.sandvik/en/products/metal-powder/list-of-materials/. Many other companies provide metal powders which may be suitable for 3D printing, including Global Advanced Metals supplying tantalum powders; Sri Kaliswari Metal Powders supplying air atomized aluminum powder and pyrotechnic aluminum powder; Astro Alloys supplying cobalt, iron, nickel, and titanium powders; POLEMA supplying spherical iron-, nickel-, cobalt-, molybdenum- and tungsten-based powders; CNPC providing powders including Stainless Steel, Inconel®, Invar®, Kovar®, aluminum alloys, copper and alloys; Valimet who manufacture spherical atomized metal powders; Hoganas AMPERPRINT® providing nickel alloy, cobalt alloy, and iron alloy powders; METASPHERE spherical metal powders; VDM Metals Alloy 36, Alloy 625, Alloy 718 or Alloy 82 powders; US Metal Powders (USMP) fine aluminum powders; Toyal Europe which belongs to the Toyal Group, a global manufacturing and supply network established by Toyo Aluminium KK, based in Japan, providing aluminum powders; AMC Powders producing powders by gas atomization including titanium alloy, superalloy, aluminum alloy, special steel and high-melting metals; Powmet ultra-pure metallic powders; Hilderbrand & Cie SA precious metal brazing & soldering powders for 3D manufacturing; MD Alloys producing powders for the dental and medical industries; AP&C producing metal powders from titanium and other reactive or high melting point alloys such as nickel superalloys and niobium; and H. C. Starck producing tungsten, molybdenum, tantalum, niobium, and rhenium powders.

In embodiments, the 3D printing powder comprises a combination of one or more non-metal powders such as a member of the group consisting of polyamide, high density polyethylene, polylactic acid, polyalkanoates, polyesters, polyether ether ketone, polycarbonate, polyoxymethylene, polymethyl methacrylate, polystyrene, and polyethylene-high density, and combinations thereof, and a metal or metal-containing powder such as a metal, a metal alloy, or a combination thereof. The common name for polyamide is nylon. For example polyamide PA12 is also known as nylon 12, polyamide PA6 is also known as nylon 6.

In further embodiments, the three-dimensional metal printing powder comprises a metal selected from the group consisting of titanium, aluminum, silver, cobalt, chromium, copper, iron, nickel, gold, palladium, stainless steel, platinum, palladium, tantalum, rhenium, niobium, alloys thereof, and combinations thereof.

In one embodiment, the 3D printing powder herein comprises a mixture of a metal powder and a non-metal powder.

In another embodiment, the 3D printing powder herein comprises a hybrid particle, wherein the hybrid particle is comprised of a metal and a non-metal.

In embodiments, the three-dimensional metal printing powder comprises a non-metal 3D powder and a metal selected from the group consisting of titanium, aluminum, silver, cobalt, chromium, copper, iron, nickel, gold, palladium, stainless steel, alloys thereof, and combinations thereof. In embodiments, the three-dimensional metal printing powder comprises a non-metal 3D powder and one or more metal alloys, such titanium alloys such as Ti6Al4V, TiAl, aluminum alloys, cobalt-chromium alloys, nickel-based superalloys, and others.

In further embodiments, the three-dimensional metal printing powder comprises a 3D printing powder comprised of a hybrid particle including a non-metal and one or more metal alloys. In embodiments this can include a binder and a metal or metal alloy. A specific example is Alumide, which can be a PLA (polylactic acid) binder filled with aluminum, or polyamide filled with aluminum, such as Prodways PA12-GFX 2550, which is a glass beads and aluminum filled polyamide 12 (PA12).

The organic polymeric surface additive composition may be combined with a 3D printing powder so that the organic polymeric surface additive is present in an amount of from about 0.05 percent to about 2 percent by weight, or from about 0.2 percent to about 1.4 percent by weight, or from about 0.3 percent to about 1 percent by weight, based upon the weight of the 3D printing powder. In certain embodiments, the organic polymeric surface additive having a volume average particle diameter of from about 20 nanometers to less than 70 nanometers is present in an amount of from about 0.05 parts per hundred to about 2 parts per hundred by weight, based on 100 parts by weight of base 3D printing powder. In embodiments, the polymeric composition may cover from about 5 percent to about 100 percent, or from about 10 percent to about 100 percent, or from about 20 percent to about 50 percent of the surface area of the 3D powder particles.

In embodiments, the organic polymeric additive has a total surface loading of from about 0.01 to about 5 parts per hundred by weight based on the weight on the three-dimensional metal printing powder.

In embodiments, the three-dimensional printing powder and the organic polymeric additive are combined to form a mixture according to the formula $$0.2 < (w \bullet D \bullet P)/(0.363 \bullet d \bullet p) < 1.2$$

wherein, for the three-dimensional metal printing powder, D is the D50 average size of the powder in microns and P is the bulk density in grams/cm$^3$; and wherein, for the organic polymeric additive, d is the D50 average particle size in nanometers, p is the bulk density is grams/cm$^3$, and w is the weight added to the mixture in parts per hundred.

In embodiments, a 3D printing composition herein may contain the organic polymeric or copolymeric additive of the present disclosure described above, as well as other optional additives, as desired or required.

There can also be blended with the 3D metal printing powder external additive particles including flow aid additives. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof. In embodiments, the 3D printing composition herein further comprises cleaning additives selected from the group consisting of stearates, cerium oxide, strontium titanate, and combinations thereof.

In embodiments, silica, titania, or alumina may be applied to the 3D metal powder surface for reduced humidity sensitivity or charge control. In embodiments, silica may be applied to the 3D powder surface for powder flow, reduced water adsorption and higher blocking temperature. Titania may be applied for improved powder flow, reduced water adsorption, or to reduce 3D powder charging, which can make the 3D particles stick to each other. Zinc stearate, calcium stearate and/or magnesium stearate may optionally also be used as an external additive for providing lubricating properties of the surface, which can help powder flow as well as reduced water adsorption. In embodiments, a commercially available zinc stearate known as Zinc Stearate L, obtained from Ferro Corporation, may be used. The external surface additives may be used with or without a coating.

In embodiments, the 3D printing composition further comprises a member of the group consisting of a silica surface additive, a titania surface additive, and combinations thereof. In embodiments, the 3D printing composition comprises a silica additive, a titania additive, or a combination thereof, and at least one of the silica or titania additives has a hydrophobic treatment, in embodiments, one or more of the silica or titania additives has a polydimethylsiloxane hydrophobic treatment.

Each of these external additives may be present in an amount from about 0 parts per hundred to about 3 parts per hundred of the 3D metal printing powder, in embodiments from about 0.25 parts per hundred to about 2.5 parts per hundred of the 3D metal printing powder, although the amount of additives can be outside of these ranges. In embodiments, the 3D metal printing powder may include, for example, from about 0 parts per hundred to about 3 parts per hundred titania, from about 0 parts per hundred to about 3 parts per hundred silica, and from about 0 parts per hundred to about 3 parts per hundred zinc stearate.

In embodiments, in addition to the organic polymeric additive of the present disclosure, the 3D printing composition may also possess silica in amounts of from about 0.05 parts per hundred to about 5 parts per hundred by weight of the 3D metal printing powder, in embodiments from about 0.2 parts per hundred to about 2 parts per hundred by weight of the 3D metal printing powder, and titania in amounts of from about 0 parts per hundred to about 3 parts per hundred by weight of the 3D metal printing powder, in embodiments from about 0.1 parts per hundred to about 1 parts per hundred by weight of the 3D metal printing powder.

The 3D printing compositions herein can be used for any suitable or desired process. The 3D printing compositions can be used in laser beam melting printing processes or selective laser sintering processes. Any three dimensional printer or type of SLS printer can be employed. See, for example, U.S. Patent Publication 2018/0022043, which is hereby incorporated by reference herein in its entirety.

In embodiments, a method herein comprises providing a three-dimensional metal printing powder having an organic polymeric additive on at least a portion of an external surface of the three-dimensional metal printing powder; and optionally, further having an inorganic additive on at least a portion of an external surface of the three-dimensional metal printing powder; and exposing the three-dimensional metal printing powder having the organic polymeric additive and optional inorganic additive to a laser to fuse the three-dimensional metal printing powder. Also provided is a method of selective laser sintering comprising providing a 3D printing composition as described herein; and exposing the 3D printing composition to a laser to fuse the printing powder. In embodiments, the printing method comprises selective laser sintering, selective laser melting, direct metal laser sintering, or electron beam melting.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Organic polymeric latex additives were produced by emulsion polymerization. The 5-gallon runs were post-processed for 1 hour at 77° C. following by a 2 hour ramp to 87° C. followed by a 1 hour process at ° C. The 2-L runs were post-processed for 1 hour at 77° C.

It has been discovered that particle sizes of greater than 70 nanometers may degrade flow, but provide excellent blocking resistance. Particle sizes of about less than 70 nanometers will provide improved flow, as well as provide some blocking resistance. In embodiments, a small size latex, in embodiments of about 47 nanometers in diameter, was prepared to demonstrate flow improvement for the 3D particles.

Process for preparation of 5-gallon polymeric latex. A polymeric latex was synthesized by a semi-continuous starve-fed emulsion polymerization process. An emulsified monomer mixture was prepared in a portable tank by mixing monomers, 2.671 kilograms cyclohexyl methacrylate (CHMA), 0.9 kilograms divinylbenzene 55% technical grade (DVB-55), and 28.81 grams 2-(dimethylamino)ethyl methacrylate (DMAEMA), into a surfactant solution containing 922.14 grams 20.9% Tayca BN2060 (a dodecylbenzene sulfonate anionic emulsifier) solution and 3.591 kilograms deionized water.

A separate aqueous phase mixture was prepared in a 5-gallon reaction vessel by mixing 395.2 grams 20.9% Tayca BN2060 solution with 9.265 kilograms deionized water which was then heated to 77° C. with continuous mixing at 225 rpm. A polymer seed was prepared by adding 3% of the emulsified monomer into the reactor and mixing for a minimum of 15 minutes. After the reactor's temperature reached around 77° C., the initiator solution of 0.403 kilograms deionized water and 13.83 grams ammonium persulfate (APS) were added over 7 minutes to polymerize the seed particles. Following a 15 minute wait time, the remaining emulsified monomer was added at a controlled feed rate to the reactor over a two hours period to polymerize and grow the polymer seed particles. Once the monomer feeding is complete, the reactor was held at the reaction temperature for an extra hour, then ramped over 2 hours to an elevated temperature of 87° C. and held for an additional 2 hours to lower the residual monomers levels. During the post reaction process the latex was buffered with 0.1 M sodium hydroxide (NaOH) solution to maintain pH between 5.5 and 6.0. The latex was then cooled to room temperature and discharged through 5 micron welded polypropylene filter bag. The resulting product was an aqueous polymer latex that contains about 20 weight percent solids. The final particle size of the latex was 47 nanometers. Particle size was determined using a Nanotrac NPA252 with the following settings: Distribution—Volume, Progression—Geom 4 Root, Residuals—Enabled, Particle Refractive Index—1.59, Transparency—Transparent, and Particle Shape—Spherical.

The 5-gallon latex was spray dried using a dual liquid nozzle DL41 spray dryer from Yamato Scientific Co. with drying conditions of:

Atomizing pressure: 4 kgf/cm$^2$
Sample feed rate: 3 (0.6 liters/minute)
Temperature: 140° C.
Aspirator flow rate: 4 m$^3$/minute Table 1 shows formulation for the organic polymeric additive examples. Table 2 shows process parameters. Table 3 shows particle size and residual monomers.

TABLE 1

| Example | % Solids | % SLS | % SLS Upfront | % APS | % Seed |
|---------|----------|-------|---------------|-------|--------|
| 1 | 20 | 0.4 | 44.15 | 0.38 | 5 |
| 2 | 20 | 0.4 | 44.15 | 0.38 | 5 |
| 3 | 20 | 0.4 | 50 | 0.38 | 5 |
| 4 | 20 | 0.5 | 50 | 0.38 | 5 |
| 5 | 20 | 0.5 | 50 | 0.5 | 5 |
| 6 | 20 | 0.5 | 50 | 0.5 | 3 |
| 7 | 20 | 0.5 | 50 | 0.65 | 2.5 |

TABLE 1-continued

| Example | % Solids | % SLS | % SLS Upfront | % APS | % Seed |
|---|---|---|---|---|---|
| 8 | 18 | 0.48 | 50 | 0.38 | 5 |
| 9 | 20 | Tayca 1.24 | 30 | 0.38 | 5 |
| 10 | 20 | Tayca 1.24 | 30 | 0.38 | 3 |

SLS = sodium lauryl sulphate.
APS = ammonium persulfate.

TABLE 2

| Example | Reactor Size | Mixing rpm | Monomer Feed Time (Hours) |
|---|---|---|---|
| 1 | 2 Liter | 400/450 | 2 |
| 2 | 5 Gallon | 225/275 | 2 |
| 3 | 2 Liter | 400/450 | 2 |
| 4 | 2 Liter | 400/450 | 2 |
| 5 | 2 Liter | 400/450 | 2 |
| 6 | 5 Gallon | 250/300 | 2 |
| 7 | 2 Liter | 450/500 | 2 |
| 8 | 2 Liter | 400/450 | 2 |
| 9 | 2 Liter | 400/450 | 2 |
| 10 | 5 Gallon | 225/275 | 2 |

TABLE 3

| Example | Particle Size (Nanometers) | GC Residual Monomers | | |
|---|---|---|---|---|
| | | CHMA (ppm) | DVB (ppm) | Total (ppm) |
| 1 | 60.1 | NA | NA | NA |
| 2 | 63.2 | 25 | 16 | 41 |
| 3 | 68.2 | NA | NA | NA |
| 4 | 57.4 | NA | NA | NA |
| 5 | 56.8 | NA | NA | NA |
| 6 | 58.6 | 27 | 10 | 37 |
| 7 | 74.5 | NA | NA | NA |
| 8 | 54.0 | NA | NA | NA |
| 9 | 49 | NA | NA | NA |
| 10 | 47 | <30 | <40 | <70 |

NA = not applicable.
ND = not detected.

Organic Polymeric Additive Blending. Mathematically the general ideal formula for the coverage of spherical organic surface additive on a larger particle surface is given by:

$$0.2 < (w \cdot D \cdot P)/(0.363 \cdot d \cdot p) < 1.2$$

where for the 3D powder, D is the D50 average size in microns and P is the bulk density in grams/cm$^3$, and for the organic emulsion polymerized latex, d is the D50 average size in nanometers, p is the bulk density in grams/cm$^3$, and w is the weight added to the mixture in pph.

In general, effective amounts of an additive for flow or blocking range can be from about 0.2 to 1.2 of full coverage. The value of 0.2, indicates 0.2 of the surface is covered, and a value of 1 indicates full coverage of the surface. If the particles have some surface roughness or are not truly spherical they will require somewhat higher coverage as their surface area is higher than expected based on the size and density, so a value as high as 1.2 may be required, as indicated in the formula.

For metal powders to have excellent flow using the present organic polymeric additives, a range in percent surface area coverage is determined and the mass of the organic additive to blend with the metal powders is established according to the above equation.

Evaluation of Flow Properties. It is also desirable that the particle shape is spherical to induce a free flowing powder. To access particle flow, aerated and tap bulk density are measured and then that data is used to calculate the Hausner ratio HR. A material with a Hausner ratio HR<1.25 is an indication of a free flowing powder behavior, 1.25 to 1.5 as moderate flowing, and a HR>1.5 means a poor flowing powder with fluidization problems due to high cohesive forces. Particle density impacts the fluid bed density which is influenced by the particle shape. An alternate measurement for flow of a powder is angle of repose, the lower the angle of repose the better the flow of the powder. The following Table 4 categorizes flow according to R. L. Carr, Evaluating Flow Properties of Solids, Chem. Eng. 1965, 72, 163-168.

TABLE 4

| Flow Property | Angle of Repose (degrees) |
|---|---|
| Excellent | 25-30 |
| Good | 31-35 |
| Fair - aid not needed | 36-40 |
| Passable - may hang up | 41-45 |
| Poor - must agitate, vibrate | 46-55 |
| Very poor | 56-65 |
| Very, very poor | >66 |

Example 11

Titanium Alloy Particles With Organic Additive For Improved Flow. Dry particles of the organic polymeric additive of Example 10 at 0.10 pph will be added to 50 grams of titanium-aluminum alloy particles Ti-6A1-4V with a particle size of 44 microns and particle true density of 4.43 g/cm$^3$ ("Influence of Particle Size on Properties of Ti-6A1-4V Alloy Prepared by High-Velocity Compaction", Z-Q. Yan et., Al Trans. Nonferrous Met. Soc. China, 23(2013) 361-365) and mixed on a lab SKM Mill at 13,500 rpm for 30 seconds. This provides a 100 percent surface area coverage of the base Ti-6A1-4V particles according to the equation above. After the blending step is complete, the blended material will be sieved through a 250 micron stainless steel sieve and evaluated for flow and angle of repose. The flow performance of the Ti-6A1-4V particles with the present organic polymeric surface additive are expected to show improved particle flow performance, including a lower Hauser ratio and/or a lower angle of repose.

Example 12

Stainless Steel Particles With Organic Additive For Improved Flow. Dry particles of the organic polymeric additive of Example 10 at 0.485 pph will be added to 50 grams of titanium-aluminum alloy particles 316L stainless steel particles with particle size of 5 microns and a true particle density of 7.8971 g/cm$^3$ from Pacific Metals Co. Ltd., Tokyo, Japan (see "Sintering Study of 316L Stainless Steel Metal Injection Molding Parts Using Taguchi Method: Final Density", C. H. Ji et. al, Al. Materials Science and Engineering A311 (2001), 74-82) and mixed on a lab SKM Mill at 13,500 rpm for 30 seconds. This provides a 100 percent surface area coverage of the base 316L stainless steel particles. After the blending step, the blended material will be sieved through a 150 micron stainless steel sieve, and then evaluated for flow and angle of repose. The flow performance of the stainless steel particles with the present organic polymeric surface additive are expected to show improved particle flow performance, including a lower Hauser ratio and/or a lower angle of repose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A composition comprising:
    a three-dimensional metal printing powder;
    an organic polymeric additive disposed on at least a portion of an external surface of the three-dimensional metal printing powder;
    wherein the organic polymeric additive is a copolymer comprising a first monomer having a high carbon to oxygen ratio of from about 3 to about 8, wherein the first monomer is cyclohexyl methacrylate; a second monomer comprising divinyl benzene, wherein the second monomer is present in the copolymer in an amount of from greater than about 8 percent by weight to about 40 percent by weight, based on the weight of the copolymer; and a third monomer comprising an amine, wherein the third monomer is present in an amount of from about 0.1 percent by weight to about 1.5 percent by weight, based on the weight of the copolymer, and wherein the third monomer is dimethylaminoethyl methacrylate; and
    optionally, an inorganic additive on at least a portion of an external surface of the three-dimensional metal printing powder.

2. The composition of claim 1, wherein the organic polymeric additive comprises a basic monomer having a nitrogen-containing group; and
    wherein the basic monomer having a nitrogen-containing group is present in the organic polymeric additive in an amount of less than about 1.5 percent, by weight, based on the total weight of the organic polymeric additive.

3. The composition of claim 1, wherein the organic polymeric additive comprises an acidic monomer having an acidic group selected from the group consisting of acrylic acid, beta-carboxyethyl acrylate, and combinations thereof; and
    wherein the acidic monomer is present in the organic polymeric additive in an amount of less than about 4 percent, by weight, based on the total weight of the organic polymeric additive.

4. The composition of claim 1, wherein the organic polymeric additive comprises a monomer selected from the group consisting of an acrylate monomer, a methacrylate monomer, and combinations thereof.

5. The composition of claim 1, wherein the organic polymeric additive comprises latex particles having a volume average particle diameter of from about 30 nanometers to about 140 nanometers.

6. The composition of claim 1, wherein the organic polymeric additive has a total surface loading of from about 0.01 to about 5 parts per hundred by weight based on the weight of the three-dimensional metal printing powder.

7. The composition of claim 1, wherein the three-dimensional metal printing powder and the organic polymeric additive are combined to form a mixture according to the formula $$0.2 < (w \bullet D \bullet P)/(0.363 \bullet d \bullet p) < 1.2$$

wherein, for the three-dimensional metal printing powder, D is the D50 average size of the powder in microns and P is the bulk density in grams/cm$^3$; and
wherein, for the organic polymeric additive, d is the D50 average particle size in nanometers, p is the bulk density is grams/cm$^3$, and w is the weight added to the mixture in parts per hundred.

8. The composition of claim 1, wherein the organic polymeric additive comprises latex particles produced by emulsion polymerization of at least one monomer and a surfactant;
    wherein the surfactant comprises a member selected from the group consisting of an anionic surfactant, a cationic surfactant, a non-ionic surfactant, and combinations thereof; and
    wherein the surfactant has a minimum surface tension of less than about 45 mN/m.

9. The composition of claim 1, wherein the organic polymeric additive comprises latex particles produced by emulsion polymerization of at least one monomer and a surfactant;
    wherein the surfactant comprises a member selected from the group consisting of sodium dodecylbenzene sulfonate, sodium dodecyl sulphate, and combinations thereof.

10. The composition of claim 1, wherein the three-dimensional metal printing powder comprises a metal selected from the group consisting of titanium, aluminum, silver, cobalt, chromium, copper, iron, nickel, gold, palladium, stainless steel, platinum, palladium, tantalum, rhenium, niobium, alloys thereof, and combinations thereof.

11. The composition of claim 1, wherein the three-dimensional metal printing powder comprises a mixture of a metal powder and a non-metal powder.

12. The composition of claim 1, wherein the three-dimensional metal printing powder comprises a hybrid particle, wherein the hybrid particle is comprised of a metal and a non-metal.

13. The composition of claim 1, wherein the composition comprises two or more organic polymeric additives;
    wherein a first organic polymeric additive has a first average D50 particle size;
    wherein a second organic polymeric additive has a second average D50 particle size; and
    wherein the first and second average D50 particle size differ by at least about 10 nanometers.

14. The composition of claim 1, wherein the organic polymeric additive disposed on at least a portion of an external surface of the three-dimensional metal printing powder is disposed by spray drying.

15. The composition of claim 1, wherein the three-dimensional metal printing powder comprises a metal selected from the group consisting of titanium, aluminum, stainless steel, alloys thereof, and combinations thereof.

16. A process comprising:
    providing a three-dimensional metal printing powder;
    spray drying an organic polymeric additive on at least a portion of an external surface of the three-dimensional metal printing powder;

wherein the organic polymeric additive is a polymer or copolymer comprising a first monomer having a high carbon to oxygen ratio of from about 3 to about 8, wherein the first monomer is cyclohexyl methacrylate; a second monomer comprising two or more vinyl groups, wherein the second monomer is divinylbenzene, wherein the second monomer, is present in the copolymer in an amount of from greater than about 8 percent by weight to about 40 percent by weight, based on the weight of the copolymer; and a third monomer comprising an amine, wherein the third monomer is present in an amount of from about 0.1 percent by weight to about 1.5 percent by weight, based on the weight of the copolymer, and wherein the third monomer is dimethylaminoethyl methacrylate;

optionally, further providing an inorganic additive on at least a portion of an external surface of the three-dimensional metal printing powder;

wherein the organic polymeric additive is prepared by emulsion polymerization.

17. The method of claim 16, wherein the three-dimensional metal printing powder comprises a metal selected from the group consisting of titanium, aluminum, stainless steel, alloys thereof, and combinations thereof.

18. A method comprising:

providing a three-dimensional metal printing powder having an organic polymeric additive on at least a portion of an external surface of the three-dimensional metal printing powder; wherein the organic polymeric additive is a polymer or copolymer comprising a first monomer having a high carbon to oxygen ratio of from about 3 to about 8, wherein the first monomer is cyclohexyl methacrylate; a second monomer comprising divinylbenzene, wherein the second monomer is present in the copolymer in an amount of from greater than about 8 percent by weight to about 40 percent by weight, based on the weight of the copolymer; and a third monomer comprising an amine, wherein the third monomer is present in an amount of from about 0.1 percent by weight to about 1.5 percent by weight, based on the weight of the copolymer, and wherein the third monomer is dimethylaminoethyl methacrylate; and exposing the three-dimensional metal printing powder having the organic polymeric additive and optional inorganic additive to a laser to fuse the three-dimensional metal printing powder.

19. The method of claim 18, wherein the method comprises selective laser sintering, selective laser melting, direct metal laser sintering, or electron beam melting.

20. The method of claim 18, wherein the three-dimensional metal printing powder comprises a metal selected from the group consisting of titanium, aluminum, stainless steel, alloys thereof, and combinations thereof.

* * * * *